United States Patent [19]

Esztergar

[11] Patent Number: 5,291,422
[45] Date of Patent: Mar. 1, 1994

[54] BROADBAND INSTRUMENT FOR NONDESTRUCTIVE MEASUREMENT OF MATERIAL PROPERTIES

[75] Inventor: Ernest P. Esztergar, La Jolla, Calif.

[73] Assignee: SGI International, La Jolla, Calif.

[21] Appl. No.: 826,780

[22] Filed: Jan. 28, 1992

[51] Int. Cl.⁵ .............................................. G01N 21/47
[52] U.S. Cl. ................................... 364/551.01; 73/618
[58] Field of Search ................ 73/61.69, 61.72, 64.43, 73/597, 618; 364/551.01, 413.26, 563, 557; 250/337, 358.1, 359.1, 357.1

[56] References Cited

U.S. PATENT DOCUMENTS

| | | | |
|---|---|---|---|
| 3,691,455 | 9/1972 | Moisio | 324/0.5 R |
| 4,345,840 | 8/1982 | Goetz | 356/407 |
| 4,556,847 | 12/1985 | Aspiotis | 324/307 |
| 4,616,317 | 10/1986 | Croteau | 364/413.26 |
| 4,701,705 | 10/1987 | Rollwitz | 324/306 |
| 4,756,866 | 7/1988 | Alvarez | 376/157 |
| 4,757,201 | 7/1988 | Kanter | 250/337 |
| 4,875,773 | 10/1989 | Burns | 356/328 |
| 4,883,354 | 11/1989 | Sun | 356/128 |
| 4,885,709 | 12/1989 | Edgar et al. | 364/563 |
| 4,898,476 | 2/1990 | Herrmann et al. | 364/557 |
| 4,916,643 | 4/1990 | Ziegler et al. | 364/557 |
| 4,974,182 | 11/1990 | Tank | 364/557 |
| 5,021,981 | 6/1991 | Swartzel et al. | 364/557 |
| 5,095,453 | 3/1992 | Pierson et al. | 364/557 |
| 5,127,268 | 7/1992 | Kline | 73/597 |

Primary Examiner—Jack B. Harvey
Assistant Examiner—Thomas Peeso
Attorney, Agent, or Firm—Spensley Horn Jubas & Lubitz

[57] ABSTRACT

An instrument for measuring the properties of materials. This nondestructive, noncontacting instrument detects electromagnetic radiation from the materials across a wide range of the electromagnetic spectrum, and combines these diverse data so as to derive the material property values desired. In particular, the properties detectable through particle magnetic resonance, spectroscopy of light in the infrared-visible-ultraviolet range, and detection of x-ray and gamma ray radiation may be included in the instrument. Sensors detect each wavelength band of electromagnetic radiation, and data from all of these sensors is merged in a central data processor to evaluate the material properties of interest.

38 Claims, 4 Drawing Sheets

BROADBAND INSTRUMENT FOR NONDESTRUCTIVE MEASUREMENT OF MATERIAL PROPERTIES

FIELD OF INVENTION

This invention relates to instruments, and more particularly to instruments that automatically and nondestructively measure the properties of materials by detecting electromagnetic radiation, and methods of using these instruments.

BACKGROUND OF THE INVENTION

Many industries are dependent on instruments that measure the properties of materials. Improved measurements often result in improved efficiency, as well as improved product quality.

For example, electric power plants burning coal must know the heating value, moisture content, ash, and sulfur in the coal they use. Coal used for liquefaction or other processing must be measured for additional properties. In the food processing industry, moisture, oil content, density, color, and other parameters are of importance in the production of baked goods, frozen foods, dairy products, cereals, and others. Moisture in wood and its derivatives is critical to lumber, paper, and related industries. Cement must have no more than a specific limit in moisture content when produced, and moisture measurements in cement during preparation and curing are often critical for sufficient durability of the final product. The chemical industry is particularly dependent on material property measurements, including polymerization, viscosity, color, transparency, and other determinations. Petroleum refining is similarly dependent on many property measurements, including heating value, hydrogen to carbon ratio, water content and others. Prospecting often requires measurements of porosity of drilling cores, kerogen content, water, and others. Clearly, the reliance of material property measurements in industry is extensive and profoundly important.

Material properties are traditionally measured by some form of invasive or destructive technique (such as weight loss or gain, combustion, combination with reagents, and the like) but can often be measured by means of electromagnetic radiation absorbed or emitted by the material. All of the critical measurements listed in the previous paragraph can be made by means of some form of electromagnetic radiation. Electromagnetic radiation measurements have the advantage that they are generally nondestructive to the sample and can be performed without making direct contact with it, other than any contact with the sample container necessary to position the sample under the appropriate sensors.

The electromagnetic spectrum spans many orders of magnitude in wavelength. Microwaves and radio waves have the longest wavelengths (millimeters to meters in wavelength), followed by infrared (micrometers), visible light (parts of a micrometer), ultraviolet (manometers), x-rays and gamma rays (sub-manometers).

Each wavelength band of the electromagnetic spectrum can be used to measure properties of materials. For example, structural and quantitative analytical determinations of material properties may be obtained. Table 1 shows the chemical information provided by the different principal regions of the electromagnetic spectrum. Radio waves can interact with the nuclei of the material in nuclear magnetic resonance (NMR), revealing molecular mobility and isotopic content. Microvaves can be selectively absorbed or phase shifted by water and other dielectrics. Infrared can be selectively absorbed by specific molecular structures. Visible light and ultraviolet are absorbed or reflected by specific atomic and molecular species in the material. X-rays and gamma rays reveal atomic and isotopic composition. Any of these wavelength bands may further be used for imaging of the sample material.

TABLE 1

ELECTROMAGNETIC SPECTRUM CHEMICAL INFORMATION

| Region | Wavelength Range | Wave Number Range | Transition |
|---|---|---|---|
| Gamma Rays | <10 pm | >$10^9$ cm$^{-1}$ | Nuclear |
| X-rays | 10 pm–10 nm | $10^9$–$10^6$ cm$^{-1}$ | K and L electron |
| Ultraviolet | 10–400 nm | $10^6$–$2.5 \times 10^4$ cm$^{-1}$ | Valence electron |
| Visible | 400–800 nm | $2.5 \times 10^4$–$1.25 \times 10^4$ cm$^{-1}$ | Valence electron |
| Infrared | 800 nm–1 mm | $1.25 \times 10^4$–10 cm$^{-1}$ | Molecular |
| Microwave | 1 mm–100 mm | 10–0.1 cm$^{-1}$ | Rotations |
| Radio-frequency | >100 mm | <0.1 cm$^{-1}$ | Spin |

Instruments that detect electromagnetic radiation may be categorized according to the type of interaction between the sample material and electromagnetic radiation. In the case of infrared absorption measurements, for example, the electromagnetic radiation that passes through the sample and is detected, the remainder being absorbed or scattered. In the case of color determinations, visible light is reflected from the sample in certain wavelength regions and is detected. In the case of NMR, radio signals are absorbed resonantly by precessing nuclei in a magnetic field as the nuclei change their spin direction. Radio signals are subsequently emitted by the nuclei as they return to their initial orientation. Emission measurements, such as radiative capture of neutrons to produce characteristic gamma rays, involve the production of detectable electromagnetic radiation following a non-electromagnetic stimulus.

Prior art instruments that measure material properties by detecting electromagnetic radiation have concentrated on one or a few wavelength bands and generally rely on one type of measurement. For example, infrared absorption or reflectance measurements are related to only a subset of the important material properties, while visible and ultraviolet spectrometers measure another set, and x-ray and gamma detectors yet another set of material properties, each sensing and detecting technique being restricted to specific wavelength limits. Such separate measurement processes are inefficient for inhomogeneous materials because multiple separate samples must normally be obtained for each instrument to create a representative data set.

An additional disadvantage of prior art instruments is that the data obtained from such fragmented diagnostics often has limited utility until it can be combined with measurements from other measurement modes. This is particularly the case for complex manufacturing processes in which control is exercised most effectively when data from diverse measurement means are combined to produce an overall status evaluation of the process plant.

The fusion of data from diverse measurement techniques can provide additional information about the material not measured but inferred from the combination of measurements, involving conservation laws and other principles. However, data fusion is generally labor intensive, since the instruments providing measurements by different modalities are usually difficult to adapt to each other. The data, and the electronic or physical forms of the data, are often incompatible, requiring manual translation and analysis.

To consider a specific example, coal properties of interest to many users are the moisture content, hydrogen content not bound in water,, heating value, and sulfur in various forms. The hydrocarbon molecular forms and some sulfur compounds can be measured by infrared spectroscopy, the interstitial water can be seen with microwaves, and other compounds can be detected by visible and ultraviolet spectroscopy. These tests are generally performed using separate instruments, and combined to determine the coal properties.

SUMMARY OF THE INVENTION

A new instrument has been designed which obtains data on a single sample using multiple portions of the electromagnetic spectrum, such as radio frequency, microwave, infrared, visible, ultraviolet, x-ray, and gamma ray measurements. The desired material property values are then determined by analysis of the data from all the sensors together, using data-fusion analysis methods.

What is described is an instrument which measures material properties using a plurality of measurement means, spanning a wide range of the electromagnetic spectrum, and then merges the resulting diverse data to characterize the material properties better than could be accomplished with each measurement means alone. In addition, the instrument can perform these tests nondestructively and rapidly, using a single sample of the material.

An advantage of the invention is that it provides material property measurements which could not be obtained previously, or could be obtained only by performing multiple separate measurements, and then combining the data from those measurements, each subject to an error band which cumulatively degrades the accuracy of the measurements. Traditionally, large numbers of measurements and large numbers of samples are used to provide a statistically based improvement in the accuracy of the measured material properties. The invention performs its multiple measurements automatically on a single sample, thereby eliminating the need for multiple samples, increasing accuracy, and saving both time and labor.

Additionally, some material properties are difficult to measure directly. The invention allows measurement of such material properties indirectly by performing measurements which are more easily made, and then applying data-fusion techniques to derive the desired quantities. The resultant uncertainties in the final quantities are substantially lower than achievable through direct measurement alone.

Each wavelength band of the electromagnetic spectrum employed in the inventive instrument is measured by a single sensor. Examples of sensor types are given in Table 2. Each sensor is monitored, and its data accumulated, by a dedicated controller. Some analysis, such as signal averaging or scaling, may be performed by the dedicated controller. The data from each sensor is then sent to a central data processor, where analysis algorithms are used to deduce material properties of interest from the sensor data.

TABLE 2.

Examples of sensors

ESR (Electron Spin Resonance) systems
NMR (Nuclear Magnetic Resonance) systems
Microwave generation, transmission, absorption, and phase detectors
Infrared, visible, and ultraviolet spectrometers
X-ray and gamma ray emitters and detectors.

Each sensor measures electromagnetic radiation in its interactions with the material. The sensors are nondestructive and non-contacting; hence the sample is available for further uses after analysis by the invented instrument. Each sensor may detect radiation that is emitted by the sample following electromagnetic or non-electromagnetic stimuli. They may detect electromagnetic radiation that has passed through or scattered from the sample. They may detect radiation resonantly interacting with the sample. The measurement may include intensity measurements, such as in line attenuation measurements; or wavelength measurements, as in visible light spectroscopy; or image information, as in x-ray tomography; or other parameters of the electromagnetic radiation, as in free induction decay rates in NMR. (Measurements of the wavelength, wave number, frequency, and energy of electromagnetic radiation are all equivalent, and are included in the term "wavelength measurements" as used herein.) The sensors selected, and the electromagnetic radiation parameters detected, depend on the material properties which the user desires to measure.

The analysis algorithms employed for data fusion, and to derive the material properties, depend on the particular sensors incorporated in the instrument, and on which material properties are desired. The central computer thus includes sufficient computing power and storage that it can process the data from the various sensors, calculating therefrom the material properties needed for the application.

Data from individual sensors may be analyzed and combined by any means that produces a measure of the parameters of interest in the sample material. In addition, data provided by other measurement means, separate from the inventive apparatus, may be used in the analysis. For example, the sample weight may be measured by an automatic weighing station incorporated in the apparatus and the weight data transferred to the data processor. Such measurements could alternatively be measured separately and provided as input in the analysis.

A powerful method to fuse data from different measurement means, and derive values for the material properties, is to form a mathematical matrix correlating the desired parameters to the measured quantities. The desired parameters can be determined by solving the matrix (by diagonalization, for example) so long as the number of different types of measurements are sufficient to match the number of unknowns in the material properties to be determined from the sensor data.

Whenever a number of quantities are measured experimentally, and these quantities are contained in equations that relate them to the desired parameters, the uncertainty in the final result may be reduced by combining two or more of the experimental measurements. Conservation laws, or other fundamental principles, are used to carry out this analysis by correlating the different measured quantities. This analysis is further described by example below.

The accuracy of the sensors and the adequacy of the analysis methods are checked by means of calibration samples which have been specially prepared with known constituents and known material properties. Parameters for such analysis coefficients may be determined with these calibration samples.

An advantage of the instrument is that it is comprised of nondestructive, noncontacting sensors, so that the sample may be used in further tests after the measurements are performed.

Another advantage of the method presented is that it allows data from disparate sensors to be combined efficiently, thus the material properties can be determined more quickly and more accurately than would be possible without the data fusion.

To summarize the advantages of the invention, it provides material property measurements quickly and automatically, using a single sample of test material, and it further incorporates data fusion to enable information about the material to be derived by correlation of disparate sensor data, with minimal human intervention required.

Other features and advantages of the present invention will become more apparent from the following detailed description, taken in conjunction with the accompanying drawings, which illustrate by way of example the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
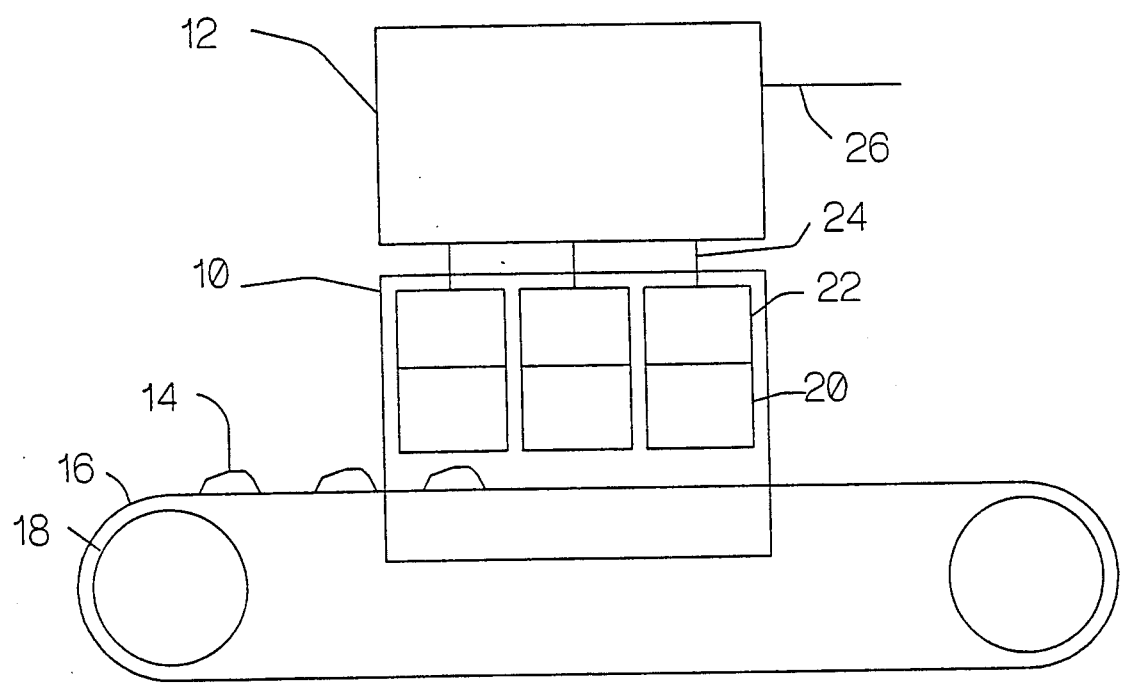
FIG. 1 schematic diagram of an instrument according to the present invention, adapted to the application of measuring properties of coal on a conveyor belt.

As shown in FIG. 1, the primary elements of an instrument according to the invention are the sensor assembly 10 and the data processor 12, which cooperate to analyze the material properties of the material samples 14. The samples 14 are carried on a conveyor means, which in this embodiment is a conveyor belt 16 driven by pulleys 18. Included within the sensor assembly 10 are a plurality of electromagnetic radiation sensors 20, each being connected electrically to a controller 22 which controls the operation of the sensor 20 to which it is attached. A controller 22 may also perform data processing on the data generated by that sensor 20 to which it is attached. Each controller 22 is connected electrically to the data processor 12. Information on the material properties of the samples 14 is sent out from the processing means 12 using a communication means 26, which may also carry instructions and additional data back into the processor 12 from a human operator or from other equipment.

Each sensor 20 consists of apparatus to stimulate electromagnetic radiation from the samples 14, in a selected wavelength band of the electromagnetic spectrum, and to detect that radiation.

Figure 2:
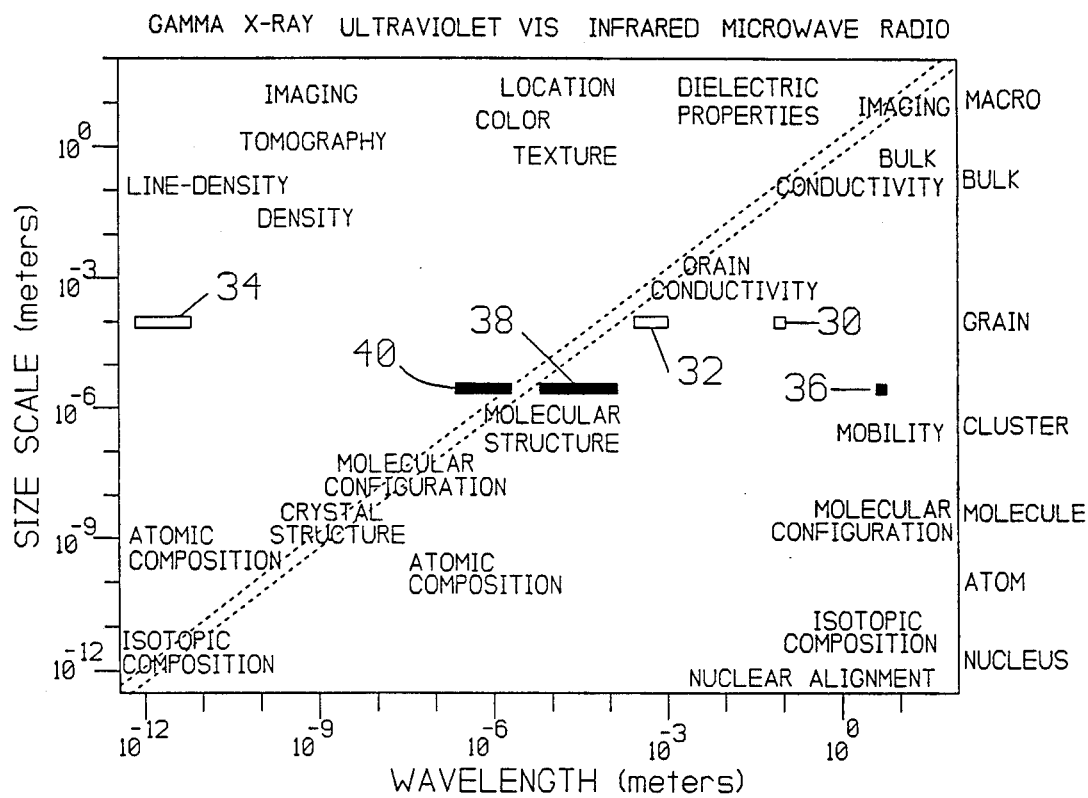
FIG. 2 is a chart shoving a variety of sensor applications across the electromagnetic sp um and across a vide range of size scales.

The sensors 20 detect electromagnetic radiation which spans a wide range of the electromagnetic spectrum. FIG. 2 shows the electromagnetic spectrum, from radio waves at the low frequency end, to gamma rays at the high frequency end, indicating in which regions the various sensor technologies are usually employed. The open and solid rectangles in FIG. 2 indicate wavelength regions sensed by the two embodiments described henceforth.

Each controller 22 is an electronic device which is electrically connected to at least one sensor 20 and which sends one or more electrical signals to the sensor 20 to affect the operation of the sensor 20. In addition, data from the sensor 20 preferably passes to the attached controller 22 for temporary storage, and initial data processing may be performed by the controller 22. In the embodiment of FIG. 1, each controller 22 is a microprocessor.

The data processor 12 is a device with sufficient data processing and communication capabilities that it acts as an interface between the raw data and the user. The processor means in the embodiment of FIG. 1 is a computer which includes one digital I/O (input/output) communication port connected to each controller means 22, and one I/O port to provide processed results to the user through the connection means 26.

If one of the controllers 22 contains sufficient computing power, that controller 22 may be used as the data processor 12 for the entire sensor assembly 10 as well as being the controller 22 for one of the sensors 20.

The connection means 24 are any means for conveying information between each controller 22 and the data processor 12. In the embodiment of FIG. 1, the connection means 24 is a multiconductor ribbon cable carrying information as a parallel-type digital communication line. The communication means 26 is any means for conveying information between the data processor 12 and the user. In the embodiment of FIG. 1, the communication means 26 is a fiberoptic or other suitable communication line carrying information in serial digital form.

In the embodiment of FIG. 1, all the sensors 20 are contained within a single structural support, which defines the periphery of the sensor assembly 10. Alternatively, the sensor assembly 10 may be comprised of a plurality of separate chassis which are not mechanically connected to each other and which each contain one or more of the sensor means 20.

The conveyor means is any means for spatially positioning the samples 14 relative to the sensor assembly 10 so as to allow each of the sensors 20 to stimulate and detect electromagnetic radiation from the samples 14. In FIG. 1, the conveyor means is a flexible conveyor belt 16 upon which samples 14 have been placed, and which is driven by a motor (not shown) so as to move the samples 14 past the sensors 20. The motor is controlled so as to stop for a preset time interval when each sample 14 is aligned with each sensor 20. Alternatively, the motor could drive the belt 16 sufficiently slowly that each sensor 20 receives a sufficient amount of electromagnetic radiation, to allow the material properties to be determined therefrom.

The embodiment of FIG. 1 is adapted to the application of measuring the material properties of coal, including the heating value, moisture, sulfur content, and ash content. The sensors 20 in the embodiment of FIG. 1 are: an infrared spectrometer, a microwave phase-shift monitor, and a nuclear gamma ray spectrometer. The wavelength bands detected by these sensors 20 are indicated by the open rectangles in FIG. 2. None of these sensors 20 can measure all of the needed material properties by itself, but in combination the data from all the sensors 20, when analyzed by the processor 12, the desired material properties may be found.

Each sensor 20 provides information about the coal by detecting one band of the electromagnetic spectrum. The microwave detector measures the density and the free moisture content in the sample 14 by detecting the amplitude and phase shift of microvaves passing through the sample. The infrared spectrometer measures the ratio of C—H to O—H bonds by determining ratios of spectral lines. The nuclear gamma ray detector determines the relative abundances of hydrogen, oxygen, sulfur, and other elements by observing radiative capture gammas and nuclear de-excitation gammas following neutron exposure of the sample 14. These sensors span the wavelength range of $10^{-1}$ meters for microwaves (indicated by the open box number 30 in FIG. 2), $10^{-4}$ meters for the infrared (open box 32), to $10^{-12}$ meters for the gamma rays (open box 34).

Instruments capable of detecting microvaves, infrared, and gamma rays separately are available commercially. These instruments typically are provided with controllers included, or are easily attached to suitable microprocessor-based controllers. Also, the other elements used in the data fusion part of the invention—data processors, communication links, and conveyor means—are commercially available. These elements are known to those skilled in the art of nondestructive sensing, and therefore these elements vill not be described in detail here.

The data from the sensors 20 are combined by the data processor 12 to calculate the desired material properties. In most practical applications, the properties of materials can be described by a set of overlapping simultaneous equations in which the variables are the constituents of the material. In the case of coal, the desired parameters are related to the constituents of the coal, including the hydrogen content, the bound and free water, elemental carbon, and other elemental constituents.

The parameters measured by the sensors 20 may also be described using the same set of variables, in a different set of equations. A mathematical matrix is often useful in analyzing data of this type. When a plurality of desired parameters are related to a plurality of measured quantities through common variables, a matrix can be formed as follows: The columns correspond to the material constituents or other primitive quantities which are common to the material property equations and the measured parameter equations. The rows of the matrix correspond to the measured parameters observed by the sensors 20. The elements of the matrix are coefficients representing the relative abundances of the constituent chemical species. The matrix can then be solved to obtain values for the material constituents in terms of the measured quantities, and the desired material properties can then be calculated from the constituents.

For example, the embodiment of FIG. 1 provides measurements from which the elemental constituents carbon, hydrogen, oxygen, sulfur, and other chemical elements may be determined. The desired material properties, such as the heating value and moisture content, may be found from these constituents.

The heating value of coal is a direct measure of its chemical energy and is a parameter for determining its value as a fuel. As the rank of coal increases, the ratio of fixed carbon to moisture and the heating value both increase. The amount of fixed carbon establishes rank, but heating value also depends on moisture and other chemical elements.

Table 3 shows a matrix formed according to this procedure. Each column corresponds to an atomic constituent, each row corresponds to the data from one of the sensors, and the matrix elements are the coefficients relating them. The symbols C, H, S, O, and Z represent carbon, hydrogen, sulfur, oxygen, and other elements in the material. The symbol M represents the moisture measurement from the microwave sensor. The symbol CH/CO represents the ratio of C—H bonds to C—O bonds from the infrared data. The remaining elemental symbols on the left side represent elemental abundance measurements derived from the gamma ray data.

TABLE 3

| | Matrix analysis of coal data. | | | | |
|---|---|---|---|---|---|
| | C | H | S | O | Z |
| M | — | a | — | b | — |
| CH/CO | c | d | — | e | — |
| H | — | f | — | — | — |
| O | — | — | — | g | — |
| S | — | — | h | — | — |
| Z | — | — | — | — | i |

The material properties can be found by solving this matrix and then putting the constituent quantities into equations for the desired properties. For example, the "higher" heating value, HHV is related to the elemental quantities by the following formula:

$$HHV = \alpha (C) + \beta (H) + \gamma (2S - O)$$

Here the Greek letters represent coefficients determined by calculation or calibration, and the capital letters represent elemental constituents. The other material properties to be determined may be found in a similar fashion, so long as all of the primitives or constituents comprising the equations for the material properties are determined by the matrix of measured parameters.

The matrix (Table 3) is solved (for example by Gaussian elimination) and the resultant elements are contained in the equations that relate them to the material parameters. The uncertainty in the final result may be substantially reduced by invoking conservation laws relating two or more experimental measurements derived from independent means.

As an example, consider a material parameters P1 and P2 which are related to a measurement M through the conservation law M=P1+P2, where the desired quantity is P1. The uncertainty in P1 is much greater than the uncertainty in the measurement of M because P2 is unknown. Assuming that all quantities are positive, the best guess for the uncertainty in P1 is generally assumed to be M/2, that is, half the total value obtained in the measurement M. Using the invention, however, far better information on P1 can be obtained. By making measurements of multiple different types, an independent value is obtained for all the significant parameters in the problem. In the case of this example, an independent measurement of P2 would greatly improve knowledge of P1, by subtraction of the measured P2 from the measurement M. The uncertainty in P1 is related to the uncertainties in M and P2, $\delta M$ and $\delta P2$ respectively, by the following formula:

$$\delta P1 = [(\delta M)^2 + (\delta P2)^2]^{\frac{1}{2}}$$

Assuming that the uncertainties in the measurements of M and P2 are each far smaller than the magnitude of M, as is usually the case, the uncertainty in P1 is greatly reduced by means of the subsidiary measurement of P2.

In addition, the weight of the sample may be deduced from the measured quantities and compared to the actual weight as a check of the procedure. For example, the weight may be found from the following formula:

$$Weight = \sigma(C) + \Phi(H) + \theta(O) + \phi(S) + E(Z)$$

The Greek letters are here the atomic weights of these elements ($\sigma = 12$, $\Phi = 1$, and so forth). This weight value may then be compared to the weight measured by an external weighing station. Agreement between these measurements constitutes a valuable check of the system.

Material properties may be determined from individual sensor data using calibration constants. Alternatively, the data from multiple sensors may be combined using data fusion, which generally results in lower uncertainties in the derived quantities than would be possible using the data from individual sensors alone. For example, the moisture in coal may be calculated from infrared data alone, or the moisture may be derived by combining the infrared data with the gamma ray sensor measurements. The infrared data measures spectral lines corresponding to various molecular structures such as hydrogen-oxygen bonds (H—O) and hydrogen-carbon bonds (H—C). By taking ratios of the amplitudes of these lines, the moisture can be estimated using the following equation:

$$Moisture(infrared) = N(H{-}O)/(N(H{-}O) + N(H{-}C)) * \Omega$$

Here $N(H{-}O)$ is the relative number of hydrogen-oxygen bonds detected, $N(H{-}C)$ is the relative number of hydrogen-carbon bonds detected, and $\Omega$ is an average value of the ratio of moisture to the ratio shown. The constant $\Omega$ is assumed to be derived by measuring the moisture in many similar coals.

The moisture determination using infrared data alone has large uncertainty because the value of a depends on the particular origin and handling of the coal. Since a is an average over many separate samples, the uncertainty in the moisture result must be at least as large as the range over which $\Omega$ varies.

The uncertainty in the moisture determination can be reduced by combining the data from the gamma ray sensor with that from the infrared sensor. The gamma ray sensor measures, among other things, the total number of hydrogen atoms in the sample, N(H). Since essentially all of the hydrogen is attached to oxygen or to carbon atoms, a conservation law for hydrogen in the sample can be stated as follows:

$$N(H) = N(H{-}O) + N(H{-}C)$$

Combining this with the moisture equation, the calibration constant can be dispensed with:

$$Moisture(infrared + gamma) = N(H{-}O)/(N(H{-}O) + N(H{-}C)) * N(H)/2$$

Here "Moisture(infrared+gamma)" stands for the moisture as determined by the infrared and gamma ray data combined, and the factor of 2 accounts for the fact that two hydrogen atoms are in each water molecule.

Figure 3:
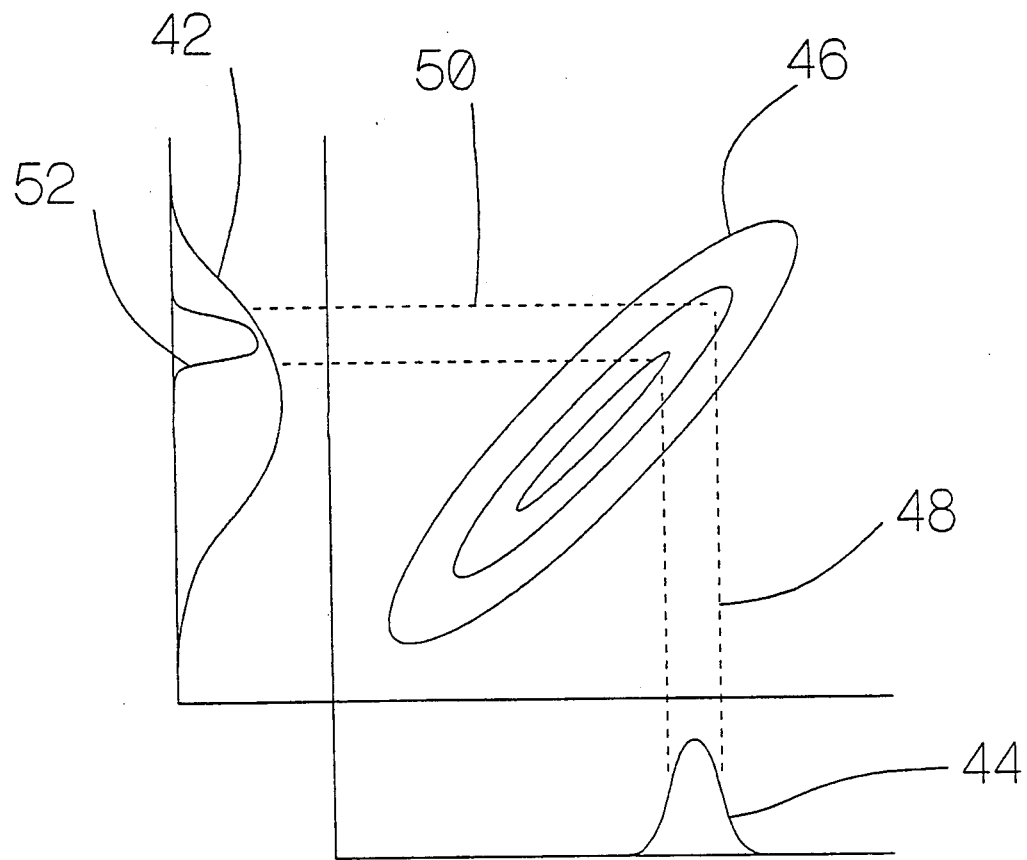
FIG. 3 is a symbolic description of data fusion for moisture determination.

FIG. 3 displays these calculations symbolically. The moisture measurement using infrared data alone is shown as the curve 42, with a broad uncertainty due to the uncertainty in the average calibration value, $\Omega$. The total hydrogen measurement is shown symbolically as the curve 44, which has low uncertainty. The correlation between the moisture and the total hydrogen is illustrated by the contour plot 46. Dotted lines 48 show the observed total hydrogen data projected onto the contour plot, and a second set of dotted lines 50 projects this measurement on to the moisture measurement. The overlap region yields a resultant curve for the moisture, curve 52. This curve is narrower in its uncertainty because the gamma ray data, combined with the correlation function and the infrared data, has lower uncertainties than the infrared data combined with the calibration constant.

External measurements may be included in the analysis, including, for example, destructive and non-electromagnetic measurements made after the electromagnetic data has been taken. To consider a specific example, the HHV heating value may be measured after all of the nondestructive tests are complete by passing the sample to a combustion calorimeter. Normally, the commercially available calorimeters measure the lower heating value (LHV) which equals the HHV minus the condensation energy contained in the exhaust gasses. The condensation energy can be calculated from the volatile content, determined from the electromagnetic radiation measurements. The LHV from the calorimeter, plus the calculated condensation energy, then may be compared with the HHV derived purely from the electromagnetic measurements, a valuable check of consistency.

The method by which the invention is practiced is comprised of the following steps:

Sample material whose properties are to be determined are placed on the conveyor means, A plurality of sensors 10 stimulate electromagnetic radiation from the sample material 14 and detect that radiation. The radiation preferably includes a plurality of wavelength bands from widely separated regions of the electromagnetic spectrum so as to allow different types of measurements to be made.

Data from each sensor 20 is passed to a data processor 12, through a controller 22 or directly from the sensor 20.

The data is then analyzed by the data processor. The analysis takes, as input, the data from the sensors 20, and calculates, as output, values for the desired material properties. Equations enabling this analysis may have been previously derived by solving a matrix whose elements are the constituents of the material.

Information on the calculated material properties is then transmitted to the user by the communication means 26.

The method may also include the step of measuring electromagnetic radiation from calibration samples whose properties are independently known. The method may also include the step of receiving data from external measurement means for use with the sensor data in the analysis.

Figure 4:
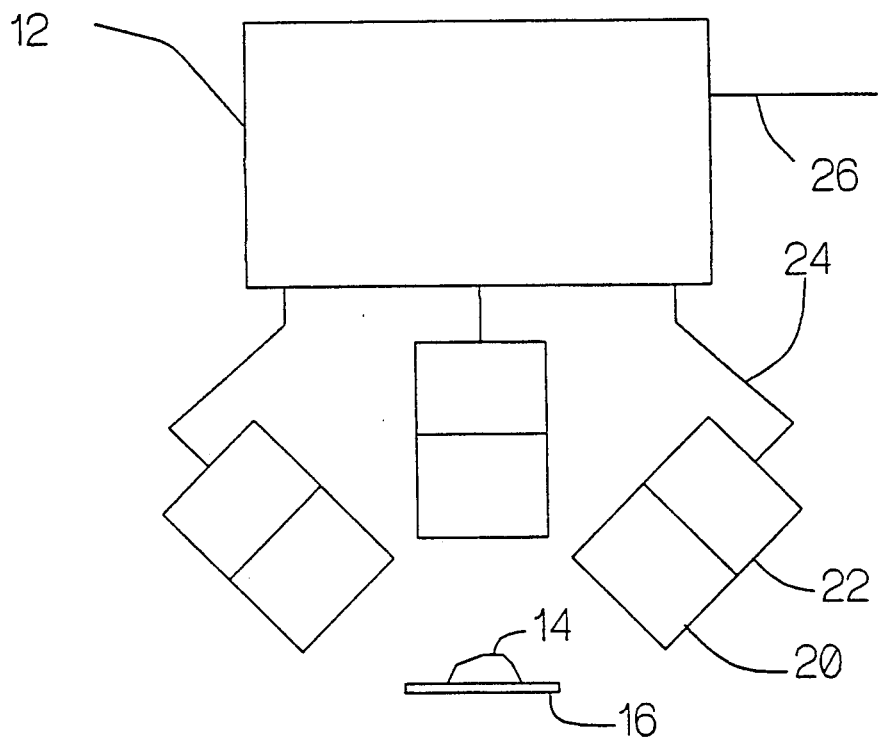
FIG. 4 is an alternative embodiment of the invention wherein multiple sensors detect electromagnetic radiation simultaneously.

An alternate embodiment of the invention is shown in FIG. 4. This embodiment is adapted to the application of measuring the quality of baked goods prior to packaging. In this embodiment, all of the sensors 20 detect electromagnetic radiation essentially simultaneously from a single sample 14. The sample material 14 remains in a fixed position in this embodiment, while the array of sensors 20 are moved into position so as to detect electromagnetic radiation from the sample 14, the sensors 20 being so positioned by means of a suitable conveyance (not shown). The material properties to be determined are the weight, color, and moisture content of the product, here assumed to be a cracker. The sensors 20 which determine these parameters are an NMR system, an optical spectrometer, and an infrared detector. The wavelength bands detected are shown by the solid rectangles 36, 38, and 40 in FIG. 2.

The NMR system is a an automatic pulsed wide-line NMR instrument which measures the amount of hydrogen in the sample 14 in fluid molecules (water and oil) as the amplitude of the free-induction decay signal. This signal is emitted by the hydrogen nuclei in the sample in the radio frequency portion of the electromagnetic spectrum. The optical spectrometer detects visible light reflected from the sample 14 to evaluate its color. The infrared detector measures various infrared transitions which are sensitive to water and oil separately.

The desired material properties are related to the measured quantities of these sensors 20. The moisture content is found from the NMR signal amplitude, corrected for the oil/water ratio as determined by the infrared spectrometer.

The weight of the sample 14 is found by two methods: the earliest portion of the NMR spectrum includes contributions from the solid as well as the liquid components in the cracker, and thus is a measure of the total hydrogen in the sample. After correction for the moisture and oil content, the remaining solid signal is an approximation of the dry basis of the sample. The other method is by infrared heating of the sample. The heat capacity of the sample 14 is measured by exposing the sample 14 to a known amount of infrared radiation and measuring the amount of infrared radiation subsequently produced by the sample 14. After correction for the specific heat capacities of the water and other constituents, the heat capacity of the sample is a measure of its weight.

The processor 12 combines the NMR, infrared, and optical spectrometer data to obtain the weight, moisture, and color parameters of the sample 14, and passes these results to the user through the communication means 26.

While the invention has been described with reference to specific embodiments, variations will be apparent to those skilled in the art in view of the above teachings. These descriptions are to be considered illustrative rather than limiting, the scope of the invention being defined in the appended claims.

What is claimed is:

1. A multi-sensor device for analyzing at least one selected property of a material, the device comprising:
   (a) at least one sensor for detecting electromagnetic radiation coming from the material in a first selected wavelength band, the radiation being indiative of a first set of properties of the material, and for outputting signals containing information about the detected radiation;
   (b) at least one sensor for detecting electromagnetic radiation coming from the material in a second selected wavelength band, the radiation being indicative of a second set of properties of the material, and for outputting signals containing information about the detected radiation, wherein the first and second wavelength bands are sufficiently separated in wavelength that different information about the first and second sets of properties of the material is provided by such radiation;
   (c) a data processor, coupled to each of the sensors, for:
      (1) receiving, as input, the output signals from each of the sensors;
      (2) performing calculations on the received signals containing information from the first selected wavelength band to determine a first set of parameters relating to the first set of properties of the material;
      (3) performing calculations on the received signals containing information from the second selected wavelength band to determine a second set of parameters relating to the second set of properties of the material;
      (4) combining the first and second set of parameters to obtain a third set of parameters relating to at least one selected property of the material; and
      (5) producing, as output from the data processing device, values relating the third set of parameters to the at least one selected property of the material.

2. A multi-sensor device for analyzing at least one selected property of a material, the device comprising:
   (a) at least one first-type sensor for detecting electromagnetic radiation coming from the material, the radiation being indicative o a first set of properties of the material, and for outputting signals containing information about the detected radiation;
   (b) at least one second-type sensor for detecting electromagnetic radiation coming from the material, the radiation being indicative of a second set of properties of the material, and for outputting signals containing information about the detected radiation, wherein the first-type and second-type sensors are not of the same type and detect different information about the first and second sets of properties of the material from such radiation;
   (c) a data processor, coupled to each of the sensors, for:
      (1) receiving, as input, the output signals from each of the sensors;
      (2) performing calculations on the received signals containing information from the first-type sensors to determine a first set of parameters relating to the first set of properties of the material;
      (3) performing calculations on the received signals containing information from the second-type sensors to determine a second set of parameters relating to the second set of properties of the material;
      (4) combining the first and second set of parameters to obtain a third set of parameters relating to at least one selected property of the material; and
      (5) producing, as output from the data processing device, values relating the third set of parameters to the at least one selected property of the material.

3. The multi-sensor device of claims 1 or 2, wherein each of the sensors comprises means for detecting radiation from the material in one of the following wavelength bands:
(a) microwave radiation;
(b) infrared radiation;
(c) visible radiation;
(d) ultraviolet radiation;
(e) X-rays;
(f) gamma rays.

4. The multi-sensor device of claims 1 or 2, wherein at least one of the sensors comprises means for detecting particle magnetic resonance radiation from the material.

5. The multi-sensor device of claims 1 or 2, wherein said electromagnetic radiation is produced exterior to said materials, passes through said materials, and then is detected.

6. The multi-sensor device of claims 1 or 2, wherein said electromagnetic radiation is produced exterior to aid materials, scatters from said materials, and then is detected.

7. The multi-sensor device of claims 1 or 2, wherein said electromagnetic radiation is produced within said materials, travels out of said materials, and then is detected.

8. The multi-sensor device of claims 1 or 2, wherein at least one of the sensors detects the intensity of electromagnetic radiation coming from the material.

9. The multi-sensor device of claims 1 or 2, wherein at least one of the sensors detects the wavelength of electromagnetic radiation coming from the material.

10. The multi-sensor device of claims 1 or 2, wherein at least one of the sensors detects temporal variations of the intensity of electromagnetic radiation coming from the material.

11. The multi-sensor device of claims 1 or 2, wherein at least one of the sensors detects the spatial distribution of electromagnetic radiation coming from the material so as to form an image of the material.

12. The multi-sensor device of claims 1 or 2, wherein the material is positioned relative to the sensors by a conveyance device.

13. The multi-sensor device of claim 12, wherein the material is so positioned relative to the sensors by the conveyance device that the sensors detect electromagnetic radiation coming from the material sequentially in time.

14. The multi-sensor device of claim 12, wherein the material is so positioned relative to the sensors by the conveyance device that the sensors detect electromagnetic radiation coming from the material essentially simultaneously.

15. The multi-sensor device of claims 1 or 2, wherein the sensors are positioned relative to the material by a conveyance device.

16. The multi-sensor device of claim 15, wherein the sensors are so positioned relative to the material by the conveyance device that the sensors detect electromagnetic radiation coming from the material sequentially in time.

17. The multi-sensor device of claim 15, wherein the sensors are so positioned relative to the material by the conveyance device that the sensors detect electromagnetic radiation coming from the material essentially simultaneously.

18. The multi-sensor device of claims 1 or 2, wherein:
(a) the first set of parameters comprises a first set of equations relating the first set of properties to the amounts of selected constituents of the material;
(b) the second set of parameters comprises a second set of equations relating each of the material properties to the amounts of the selected constituents of the material; and
(c) the third set of parameters comprises a third set of equations resulting from a combination of the first and second sets of equations, the third set of equations relating the amounts of the selected constituents to at least one selected property of the materials.

19. The multi-sensor device of claim 18, wherein the data processor further includes means for:
(a) forming a mathematical matrix from the first and second sets of parameters; and
(b) solving the matrix as a necessary step to obtain the third set of equations.

20. A method for analyzing at least one selected property of a material using multiple electromagnetic radiation sensors, comprising the steps of:
(a) detecting electromagnetic radiation coming from the material in a first selected wavelength band, the radiation being indicative of a first set of properties of the material, and outputting signals containing information about the detected radiation;
(b) detecting electromagnetic radiation coming from the material in a second selected wavelength band, the radiation being indicative of a second set of properties of the material, and outputting signals containing information about the detected radiation, wherein the first and second wavelength bands are sufficiently separated in wavelength that different information about the first and second sets of properties of the material is provided by such radiation;
(c) performing calculations in a data processing device on the output signals containing information from the first selected wavelength band to determine a first set of parameters relating to the first set of properties of the material;
(d) performing calculations in the data processing device on the output signals containing information from the second selected wavelength band to determine a second set of parameters relating to the second set of properties of the material;
(e) combining the first and second set of parameters in the data processing device to obtain a third set of parameters relating to at least one selected property of the material; and
(f) producing, as output from the data processing device, values relating the third set of parameters to the at least one selected property of the material.

21. A method for analyzing at least one selected property of a material using multiple electromagnetic radiation sensors, comprising the steps of:
(a) detecting electromagnetic radiation coming from the material using at least one first-type sensor, the radiation being indicative of a first set of properties of the material, and outputting signals containing information about the detected radiation;
(b) detecting electromagnetic radiation coming from the material using at least one second-type sensor, the radiation being indicative of a second set of properties of the material, and outputting signals containing information about the detected radiation, wherein the first-type and second-type sensors are not of the same type and detect different information about the first and second sets of properties of the material from such radiation;
(c) performing calculations in a data processing device on the output signals containing information from the first-type sensors to determine a first set of parameters relating to the first set of properties of the material;
(d) performing calculations in the data processing device on the output signals containing information from the second-type sensors to determine a second set of parameters relating to the second set of properties of the material;
(e) combining the first and second set of parameters in the data processing device to obtain a third set of parameters relating to at least one selected property of the material; and
(f) producing, as output from the data processing device, values relating the third set of parameters to the at least one selected property of the material.

22. The method of claim 20 or 21 wherein each of the sensors comprises mean for detecting radiation from the material in one of the following wavelength bands:
(a) microwave radiation;
(b) infrared radiation;
(c) visible radiation;
(d) ultraviolet radiation;
(e) X-rays;
(f) gamma rays.

23. The method of claim 20 or 21, wherein at least one of the sensors comprises means for detecting particle magnetic resonance radiation from the material.

24. The method of claims 20 or 21, wherein said electromagnetic radiation is produced exterior to said materials, passes through said materials, and then is detected.

25. The method of claims 20 or 21, wherein said electromagnetic radiation is produced exterior to said materials, scatters from said materials, and then is detected.

26. The method of claims 20 or 21, wherein said electromagnetic radiation is produced within said materials, travels out of said materials, and then is detected.

27. The method of claims 20 or 21, wherein at least one of the sensors detects the intensity of electromagnetic radiation coming from the material.

28. The method of claims 20 or 21, wherein at least one of the sensors detects the wavelength of electromagnetic radiation coming from the material.

29. The method of claims 20 or 21, wherein at least one of the sensors detects temporal variations of the intensity of electromagnetic radiation coming from the material.

30. The method of claims 20 or 21 wherein at least one of the sensors detects the spatial distribution of electromagnetic radiation coming from the material so as to form an image of the material.

31. The method of claims 20 or 21, further comprising the step of positioning the material relative to the sensors by a conveyance device.

32. The method of claim 31, wherein the material is so positioned relative to the sensors by the conveyance device that the sensors detect electromagnetic radiation coming from the material sequentially in time.

33. The method of claim 31, wherein the material is so positioned relative to the sensors by the conveyance device that the sensors detect electromagnetic radiation coming from the material essentially simultaneously.

34. The method of claim 20 or 21, further comprising the step of positioning the sensors relative to the material by a conveyance device.

35. The method of claim 34, wherein the sensors are so positioned relative to the material by the conveyance device that the sensors detect electromagnetic radiation coming from the material sequentially in time.

36. The method of claim 34, wherein the sensors are so positioned relative to the material by the conveyance device that the sensors detect electromagnetic radiation coming from the material essentially simultaneously.

37. The method of claims 20 or 21, wherein:
(a) the first set of parameters comprises a first set of equations relating the first set of properties to the amounts of selected constituents of the material;
(b) the second set of parameters comprises a second set of equations relating each of the material properties to the amounts of the selected constituents of the material; and
(c) the third set of parameters comprises a third set of equations resulting from a combination of the first and second sets of equations, the third set of equations relating the amounts of the selected constituents to at least one selected property of the materials.

38. The method of claim 37, further including the steps of:
(a) forming a mathematical matrix in the data processing device from the first and second sets of parameters; and
(b) solving the matrix with the data processing device as a necessary step to obtain the third set of equations.

* * * * *